(12) United States Patent
Zhao et al.

(10) Patent No.: US 12,307,054 B2
(45) Date of Patent: May 20, 2025

(54) DISPLAY APPARATUSES AND TOUCH PANELS

(71) Applicants: Chengdu BOE Optoelectronics Technology Co., Ltd., Sichuan (CN); BOE Technology Group Co., Ltd., Beijing (CN)

(72) Inventors: Erjin Zhao, Beijing (CN); Zhiliang Jiang, Beijing (CN); Jun Yan, Beijing (CN); Lingran Wang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/800,364

(22) PCT Filed: Jul. 26, 2021

(86) PCT No.: PCT/CN2021/108379
§ 371 (c)(1),
(2) Date: Aug. 17, 2022

(87) PCT Pub. No.: WO2023/004531
PCT Pub. Date: Feb. 2, 2023

(65) Prior Publication Data
US 2024/0295940 A1 Sep. 5, 2024

(51) Int. Cl.
*G06F 3/044* (2006.01)
(52) U.S. Cl.
CPC .................. *G06F 3/044* (2013.01)

(58) Field of Classification Search
CPC ....... G06F 3/041; G06F 3/044; G02F 1/13338
See application file for complete search history.

(56) References Cited

U.S. PATENT DOCUMENTS

| 2009/0135158 A1* | 5/2009 | Takahashi | ............ G06F 3/0447 345/174 |
| 2012/0075240 A1* | 3/2012 | Kida | ..................... G06F 3/0446 345/174 |

(Continued)

FOREIGN PATENT DOCUMENTS

| CN | 106293206 A | 1/2017 |
| CN | 108780368 A | 11/2018 |

(Continued)

OTHER PUBLICATIONS

PCT/CN2021/108379 international search report.
PCT/CN2021/108379 Written Opinion.

*Primary Examiner* — Abbas I Abdulselam
(74) *Attorney, Agent, or Firm* — IPro, PLLC

(57) ABSTRACT

Disclosed are a touch panel and a display apparatus. The touch panel includes a touch area (100) and a peripheral area (200) surrounding the touch area (100), and includes: a base substrate (1); a first touch electrode (2) and a second touch electrode (3) arranged to intersect with each other, provided on the base substrate (1) and located in the touch area (100); a first touch signal line (4), provided on the base substrate (1) and located in the peripheral area (200), and electrically connected with the first touch electrode (2); and a guard line (7) provided on the base substrate (1), located between the first touch signal line (4) and the touch area (100), and separated from the first touch signal line (4) and from the touch area (100), where the guard line (7) is in a floating state. A signal-to-noise ratio can be improved.

20 Claims, 7 Drawing Sheets

(56) References Cited

U.S. PATENT DOCUMENTS

| | | | |
|---|---|---|---|
| 2017/0075498 A1 | 3/2017 | Zhuang et al. | |
| 2017/0220160 A1* | 8/2017 | Jiang | G06F 3/0446 |
| 2018/0173062 A1* | 6/2018 | Li | G02F 1/13439 |
| 2018/0188839 A1* | 7/2018 | Wang | G06F 3/044 |
| 2019/0004656 A1 | 1/2019 | Hoka et al. | |
| 2019/0272057 A1* | 9/2019 | Chen | G06F 3/047 |
| 2019/0369787 A1 | 12/2019 | Park et al. | |
| 2020/0142563 A1* | 5/2020 | Kim | G06F 3/0418 |
| 2021/0240326 A1* | 8/2021 | Chou | G06F 3/0446 |
| 2021/0333932 A1* | 10/2021 | Li | G06F 3/0447 |

FOREIGN PATENT DOCUMENTS

| | | | |
|---|---|---|---|
| CN | 110554799 A | 12/2019 | |
| CN | 212515770 U | 2/2021 | |
| CN | 112684932 A | 4/2021 | |

\* cited by examiner

DISPLAY APPARATUSES AND TOUCH PANELS

CROSS-REFERENCE TO RELATED APPLICATIONS

The present disclosure is the U.S. national phase of PCT Application No. PCT/CN2021/108379 filed on Jul. 26, 2021, which is incorporated herein by reference in its entirety.

TECHNICAL FIELD

The present disclosure relates to the field of display technology, and in particular to a display apparatus and a touch panel.

BACKGROUND

Touch technology mainly includes resistive touch technology, capacitive touch technology and infrared optical touch technology. The capacitive touch technology is responsive and is widely used in smartphones and tablet PCs. A touch panel applying the capacitive touch technology may be provided with a touch electrode, a touch signal line and a touch chip. The touch signal line may be electrically connected between the touch electrode and the touch chip for signal transmission. However, existing capacitive touch panels have low signal-to-noise ratios.

SUMMARY

An objective of the present disclosure is to provide a display apparatus and a touch panel capable of improving a signal-to-noise ratio of the touch panel.

According to an aspect of the present disclosure, there is provided a touch panel including a touch area and a peripheral area surrounding the touch area, the touch panel including:
a base substrate;
a first touch electrode and a second touch electrode arranged to intersect with each other, provided on the base substrate and located in the touch area;
a first touch signal line, provided on the base substrate and located in the peripheral area, and electrically connected with the first touch electrode; and
a guard line provided on the base substrate, located between the first touch signal line and the touch area, and separated from the first touch signal line and from the touch area, where the guard line is in a floating state.

Further, the first touch signal line includes a first touch segment arranged in parallel with the second touch electrode, and the guard line is provided between the first touch segment and the touch area.

Further, the guard line is parallel or perpendicular to the first touch segment.

Further, a plurality of guard lines are provided between the first touch segment and the touch area.

Further, multiple of the plurality of guard lines are arranged in parallel.

Further, the multiple guard lines arranged in parallel are parallel or perpendicular to the first touch segment.

Further, the touch panel further includes:
a connecting portion, through which two of the multiple guard lines arranged in parallel are connected.

Further, any adjacent two of the multiple guard lines arranged in parallel are connected through the connecting portion, and adjacent two of respective connecting portions are arranged in a staggered fashion in a direction perpendicular to the guard lines.

Further, the connecting portion and the guard line are made of a same material.

Further, two of the plurality of guard lines are perpendicular to each other.

Further, one of the two guard lines perpendicular to each other is parallel to the first touch segment.

Further, the guard line has a same width as that of the first touch signal line.

Further, the first touch electrode includes a plurality of first touch electrodes, the first touch signal line includes a plurality of first touch signal lines, and the plurality of first touch signal lines are electrically connected with the plurality of first touch electrodes in a one-to-one correspondence; and
a guard area is provided between the first touch segment of each of the plurality of first touch signal lines and the touch area, and is provided with the guard line therein.

Further, respective guard areas are distributed at intervals in a direction in which the second touch electrode extends.

Further, the first touch signal line further includes a second touch segment, one end of the second touch segment is in contact with the first touch segment, and the other end of the second touch segment is electrically connected with the first touch electrode, and two adjacent guard areas are separated from each other by the second touch segment.

Further, the second touch segment is perpendicular to the first touch segment.

Further, the first touch signal line further includes a third touch segment, and the third touch segment is parallel to the first touch segment, and the third touch segment is in contact with the first touch electrode and the second touch segment, respectively.

Further, the first touch electrode is a touch sensing electrode, and the second touch electrode is a touch driving electrode; or
the first touch electrode is a touch driving electrode, and the second touch electrode is a touch sensing electrode.

The touch panel further includes:
a second touch signal line provided on the base substrate, located in the peripheral region, and electrically connected with the second touch electrode, where the guard line is provided between the second touch signal line and the touch area, and is separated from the second touch signal line.

Further, the base substrate includes:
a base;
a light-emitting layer provided on the base; and
an encapsulation layer provided on a side of the light-emitting layer away from the base,
where the first touch electrode, the second touch electrode, the first touch signal line, and the guard line are all provided on a side of the encapsulation layer away from the light-emitting layer.

Further, at least part of the guard line, at least part of the first touch signal line, at least part of the first touch electrode, and at least part of the second touch electrode are provided in a same layer.

According to an aspect of the present disclosure, there is provided a display apparatus including the above touch panel.

With the display apparatus and touch panel according to the present disclosure, a distance between the first touch signal line and the touch area is increased due to the existence of the guard line between the first touch signal line and the touch area, and thus a distance between the first touch signal line and the second touch electrode provided in the touch area is increased, which can reduce an interference between the first touch signal line and the second touch electrode. Meanwhile, the provided guard line can also shield the interference between the first touch signal line and the second touch electrode, to reduce noise and improve a signal-to-noise ratio (SNR) of the touch panel.

DESCRIPTION OF REFERENCE SIGNS

Figure 1:
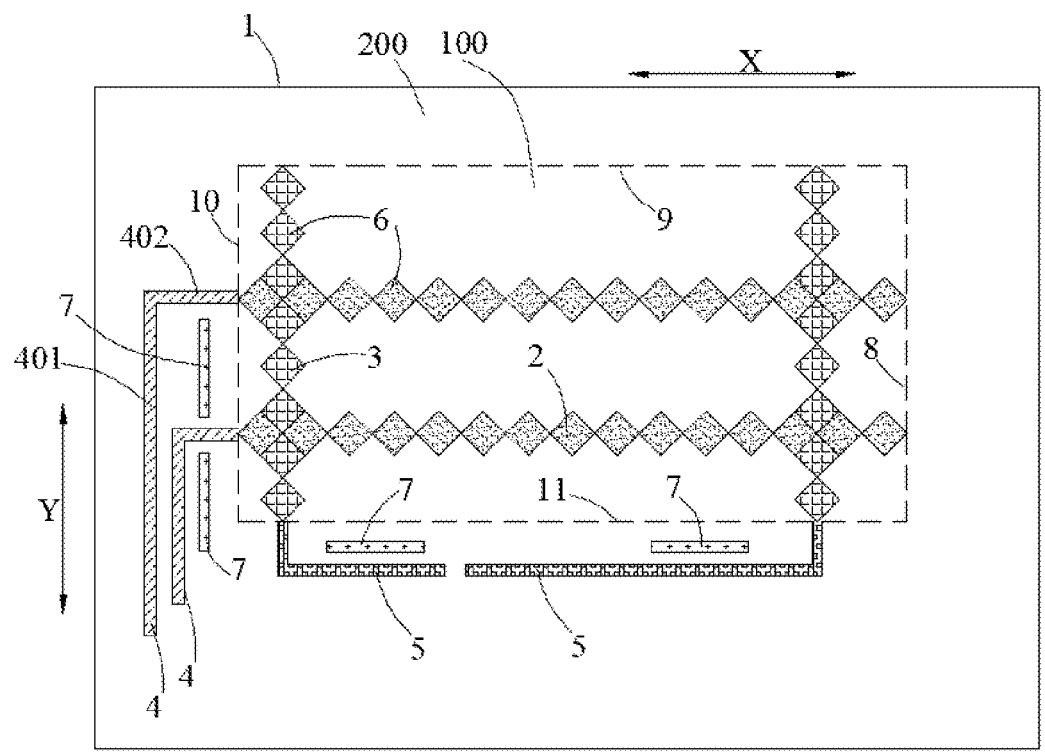
FIG. 1 is a schematic diagram illustrating a touch panel according to an embodiment of the present disclosure.

1: base substrate; 2: first touch electrode; 3: second touch electrode; 4: first touch signal line; 401: first touch segment; 402: second touch segment; 403: third touch segment; 5: second touch signal line; 6: touch electrode block; 7: guard line; 8: second side; 9: third side; 10: fourth side; 11: first side; 12: connecting portion; 13: base; 14: drive transistor; 141: active layer; 142: gate insulation layer; 143: gate electrode; 144: interlayer insulation layer; 145: source electrode; 146: drain electrode; 15: planarization layer; 16: pixel definition layer; 17: light-emitting unit; 171: anode layer; 172: luminescent material layer; 173: cathode layer; 18: encapsulation layer; 19: first insulation layer; 20: second insulation layer; 21: bridging layer; 100: touch area; 200: peripheral area; 300: bonding area; 400: guard area.

DETAILED DESCRIPTION

Exemplary embodiments will be described herein in detail, examples of which are illustrated in the drawings. When the following description involves the drawings, like numerals in different drawings refer to like or similar elements unless otherwise indicated. Embodiments described in the following exemplary embodiments do not represent all embodiments consistent with the present disclosure. Rather, they are merely examples of apparatuses consistent with some aspects of the present disclosure as detailed in the appended claims.

The terminology used in the present disclosure is for the purpose of describing particular embodiments only, and is not intended to limit the present disclosure. Unless otherwise defined, technical or scientific terms used in the present disclosure should have ordinary meanings as understood by those ordinary skilled in the art to which the present disclosure belongs. Words "first", "second", and the like, as used in the specification and claims of the present disclosure, do not indicate any sequence, quantity or importance, but are only used to distinguish between different components. Likewise, words "a" or "an" and the like do not indicate any quantity limitation, but rather indicate the presence of at least one. Word "a plurality of" or "several" indicates two or more. Unless otherwise indicated, words such as "front", "rear", "lower" and/or "upper" are for illustrative purposes only, and are not limited to a position or a spatial orientation. Words "include" or "comprise" and the like are intended to refer to that an element or object appearing before "include" or "comprise" covers an element or object listed after "include" or "comprise" and its equivalents, and do not exclude other elements or objects. Words "connect" or "couple" and the like are not limited to a physical or mechanical connection, but may include an electrical connection, whether direct or indirect. As used in the specification and the appended claims of the present disclosure, terms determined by "a", "the" and "said" in their singular forms are intended to include plural forms as well, unless clearly indicated otherwise in the context. It should also be understood that the term "and/or" as used herein refers to and includes any or all possible combinations of one or more of the associated listed items.

Embodiments of the present disclosure provide a touch panel. As shown in FIG. 1, the touch panel may include a touch area 100 and a peripheral area 200. The touch area 100 may be quadrilateral in shape; however, the touch area 100 may be circular or oval in shape, but is not limited thereto. The peripheral area 200 may surround the touch area 100. The touch panel includes a base substrate 1, a first touch electrode 2, a second touch electrode 3, a first touch signal line 4, and a guard line 7.

The first touch electrode 2 and the second touch electrode 3 are arranged to intersect with each other. The first touch electrode 2 and the second touch electrode 3 are both provided on the base substrate 1 and are located in the touch area 100. The first touch signal line 4 is provided on the base substrate 1 and is located in the peripheral area 200, and is electrically connected with the first touch electrode 2. The guard line 7 is provided on the base substrate 1, is located between the first touch signal line 4 and the touch area 100, and is separated from the first touch signal line 4 and from the touch area 100. The guard line 7 is in a floating state.

With the touch panel according to embodiments of the present disclosure, a distance between the first touch signal line 4 and the touch area 100 is increased due to the existence of the guard line 7 between the first touch signal line 4 and the touch area 100, and thus a distance between the first touch signal line 4 and the second touch electrode 3 provided in the touch area 100 is increased, which can reduce an interference between the first touch signal line 4 and the second touch electrode 3. Meanwhile, the provided guard line 7 can also shield the interference between the first touch signal line 4 and the second touch electrode 3, to reduce noise and improve a signal-to-noise ratio (SNR) of the touch panel.

Components of the touch panel according to embodiments of the present disclosure will be described in detail below.

Figure 13:
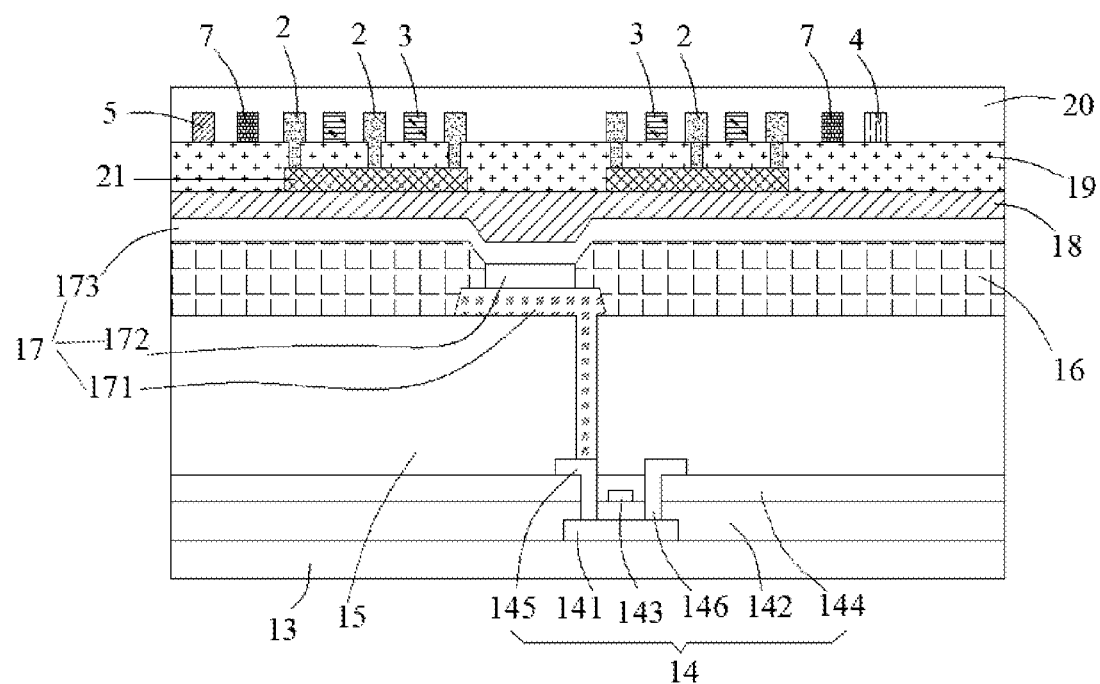
FIG. 13 is another schematic diagram illustrating a touch panel according to an embodiment of the present disclosure.

As shown in FIG. 1 and FIG. 13, the base substrate 1 may be used as a support structure of the touch panel. The base substrate 1 may include a base 13, a drive circuit layer, a light-emitting unit 17, and an encapsulation layer 18. The base 13 may be a rigid substrate, which may include a glass substrate, a PMMA (polymethyl methacrylate) substrate, or the like. However, the base 13 may be a flexible substrate, which may include a PET (polyethylene terephthalate) substrate, a PEN (polyethylene naphthalate two formic acid glycol ester) substrate, or a PI (polyimide) substrate.

As shown in FIG. 13, the drive circuit layer may be provided on the base 13. The drive circuit layer may include a drive transistor 14. The drive transistor 14 may be a thin-film transistor, but the embodiments of the present disclosure are not limited thereto. The thin-film transistor may be a top-gate thin-film transistor; however, the thin-film transistor may also be a bottom-gate thin-film transistor. For example, in the case that the thin-film transistor is a top-gate thin-film transistor, the thin-film transistor may include an active layer 141, a gate insulation layer 142, a gate electrode 143, an interlayer insulation layer 144, a source electrode 145, and a drain electrode 146. The active layer 141 may be disposed on the base 13. The gate insulation layer 142 may be disposed on the base 13 and cover the active layer 141. The gate electrode 143 may be disposed on a side of the gate insulation layer 142 away from the base 13. The interlayer insulation layer 144 may be provided on the gate insulation layer 142 and cover the gate electrode 143. The source electrode 145 and the drain electrode 146 may be provided on the interlayer insulation layer 144 and connected to the active layer 141 via vias passing through the interlayer insulation layer 144 and the gate insulation layer 142. The touch panel according to the present disclosure may further include a planarization layer 15 and a pixel definition layer 16. The planarization layer 15 may cover the source electrode 145, the drain electrode 146, and the interlayer insulation layer 144 of the thin-film transistor. The pixel definition layer 16 may be disposed on a side of the planarization layer 15 facing away from the base 13. The pixel definition layer 16 may be provided with pixel openings.

As shown in FIG. 13, the light-emitting unit 17 may be disposed at the pixel opening. The light-emitting unit 17 may include a red light-emitting unit 17, a green light-emitting unit 17, and a blue light-emitting unit 17. Each light-emitting unit 17 may include an anode layer 171, a luminescent material layer 172, and a cathode layer 173. The anode layer 171 may be disposed on a surface of the planarization layer 15 facing away from the base 13, the cathode layer 173 may be disposed on a side of the anode layer 171 facing away from the base 13, and the luminescent material layer 172 may be disposed between the anode layer 171 and the cathode layer 173. The luminescent material layer 172 may be an organic electroluminescent material layer 172, but the embodiments of the present disclosure are not limited thereto. The anode layer 171 may be electrically connected with the source electrode 145 or the drain electrode 146 of the thin-film transistor via a via passing through the planarization layer 15. The encapsulation layer 18 may cover the light-emitting unit 17 and the pixel definition layer 16. The encapsulation layer 18 may be a thin-film encapsulation (TFE) layer 18, which is not particularly limited in the embodiments of the present disclosure.

As shown in FIG. 13, the above-described first touch electrode 2 and second touch electrode 3 may be disposed on a side of the encapsulation layer 18. Compared to an out-cell touch screen, disposing the two touch electrodes on the encapsulation layer 18 can reduce a thickness of the screen without any fit tolerance. The first touch electrode 2 may extend along a first direction. The first direction is indicated by X direction in FIG. 1. The second touch electrode 3 may extend along a second direction intersecting with the first direction, that is, the first touch electrode 2 and the second touch electrode 3 are arranged to intersect with each other. The second direction is indicated by Y direction in FIG. 1. The first touch electrode 2 and the second touch electrode 3 may form a capacitance at a position where they intersect with each other. By detecting a change in the capacitance, a location of a touch point may be determined. Further, as shown in FIG. 1, the first direction may be perpendicular to the second direction, that is, the first touch electrode 2 is perpendicular to the second touch electrode 3. The touch panel may include a plurality of first touch electrodes 2 and a plurality of second touch electrodes 3. In an embodiment of the present disclosure, the first touch electrode 2 is a touch sensing electrode, and the second touch electrode 3 is a touch driving electrode. In another embodiment of the present disclosure, the first touch electrode 2 is a touch driving electrode, and the second touch electrode 3 is a touch sensing electrode. In addition, each first touch electrode 2 may include a plurality of touch electrode blocks 6 sequentially connected along the above-described first direction, and each second touch electrode 3 may include a plurality of touch electrode blocks 6 sequentially connected along the above-described second direction. As shown in FIG. 13, a bridging layer 21, a first insulation layer 19, and a second insulation layer 20 may be further provided on a side of the encapsulation layer 18 facing away from the base 13. The first insulation layer 19 covers the bridging layer 21 and the encapsulation layer 18, the first touch electrode 2 and the second touch electrode 3 are disposed on the first insulation layer 19, and the second insulation layer 20 covers the first insulation layer 19, the first touch electrode 2, and the second touch electrode 3. The first touch electrodes 2 are electrically connected with each other through the bridging layer 21.

Figure 2:
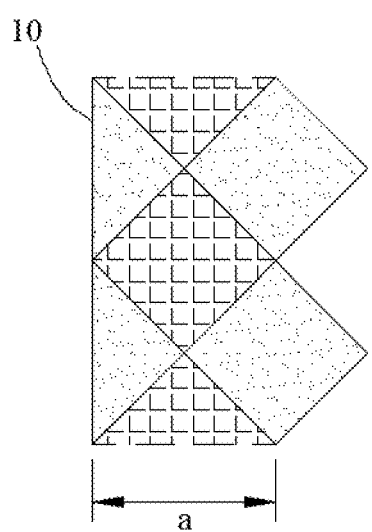
FIG. 2 to FIG. 4 are partial schematic diagrams illustrating a touch panel according to an embodiment of the present disclosure.
Figure 3:
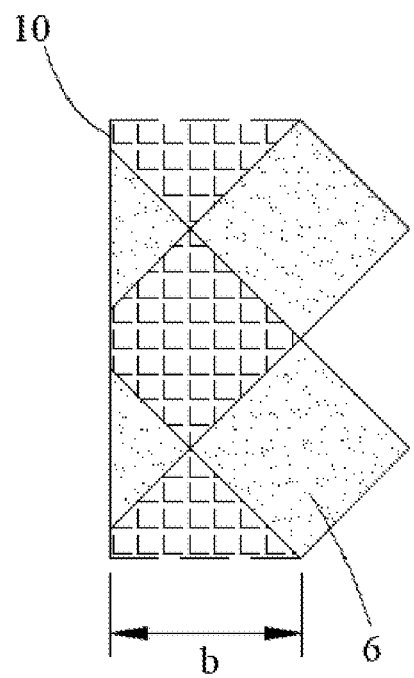
Figure 4:
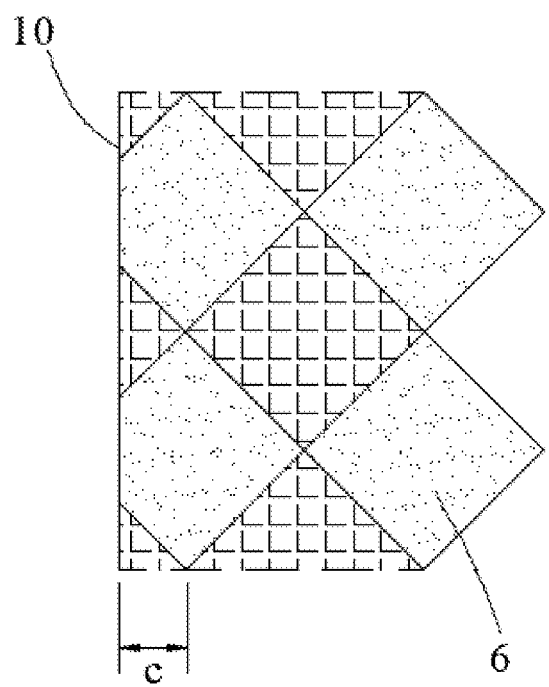

As shown in FIG. 1, for example, in the case that the above-described touch area 100 is quadrilateral in shape, the touch area 100 includes a first side 11, a second side 8, a third side 9, and a fourth side 10 that are connected in sequence. The first side 11 and the third side 9 are arranged opposite to each other and have the same length, the second side 8 and the fourth side 10 are arranged opposite to each other and have the same length, and the first side 11 may be perpendicular to the second side 8. A length of the first side 11 may be larger than that of the second side 8; however, the length of the first side 11 may also be smaller than that of the second side 8. The first direction may be parallel to the first side 11, and the second direction may be parallel to the second side 8. In addition, a portion of the first touch electrode 2 or the second touch electrode 3 located at the side of the touch area may not be a complete touch electrode block 6. Taking the second touch electrode 3 located at the fourth side 10 of the touch area as an example, FIG. 2 illustrates a portion of the second touch electrode 3 located at the fourth side 10 of the touch area is a complete touch electrode block 6, and FIGS. 3 and 4 illustrate a portion of the second touch electrode 3 located at the fourth side 10 of the touch area is an incomplete touch electrode block 6. A size a of a complete touch electrode block 6 in the first direction may be 3500 μm to 4500 μm. A size b of an incomplete touch electrode block 6 in FIG. 3 in the first direction is less than a and greater than 0.5a. A size c of an incomplete touch electrode block 6 in FIG. 4 in the first direction is less than 0.5a and greater than 0.

Figure 5:
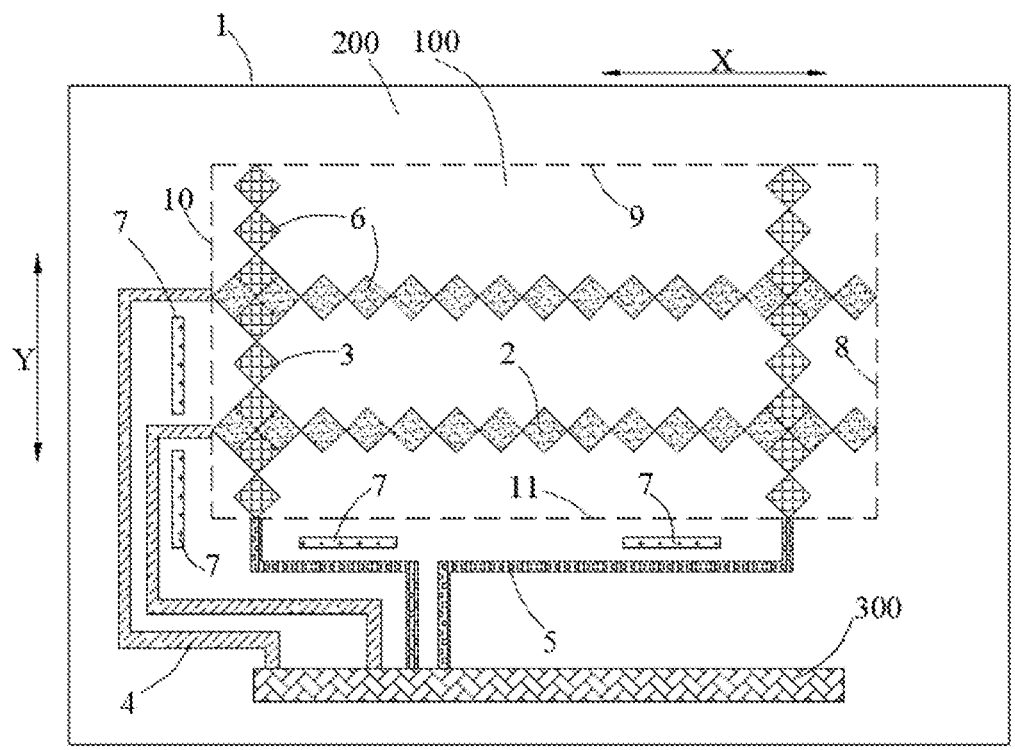
FIG. 5 and FIG. 6 are schematic diagrams illustrating a touch panel with a bonding area according to an embodiment of the present disclosure.
Figure 6:
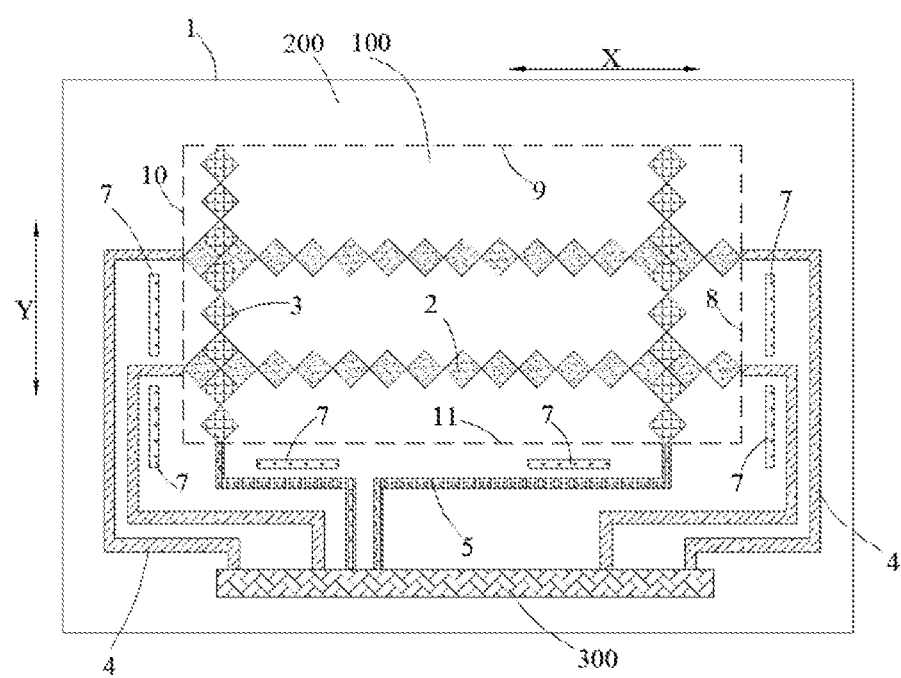

As shown in FIG. 1, FIG. 5, and FIG. 6, the first touch signal line 4 is disposed on the base substrate 1 and located in the peripheral area 200. The peripheral area 200 may be provided with a bonding area 300, in which an external circuit interface may be provided. The external circuit interface may be electrically connected with the touch chip. The bonding area 300 may be separated from the touch area 100. For example, in the case that the touch area 100 is quadrilateral in shape, the bonding area 300 may be disposed on a side of the first side 11 of the touch area 100 away from the third side 9. In other embodiments of the present disclosure, the bonding area 300 may be disposed on a side of the fourth side 10 of the touch area 100 away from the second side 8. One end of the first touch signal line 4 is electrically connected with the first touch electrode 2, and the other end of the first touch signal line 4 extends to the bonding area 300 to be electrically connected with the external circuit interface for receiving signals from the touch chip and transmitting signals to the touch chip. The touch panel may include a plurality of first touch signal lines 4 that are electrically connected with the plurality of first touch electrodes 2 in a one-to-one correspondence. As shown in FIG. 13, the first touch signal line 4 may be disposed on a surface of the first insulation layer 19 facing away from the base 13.

Figure 7:
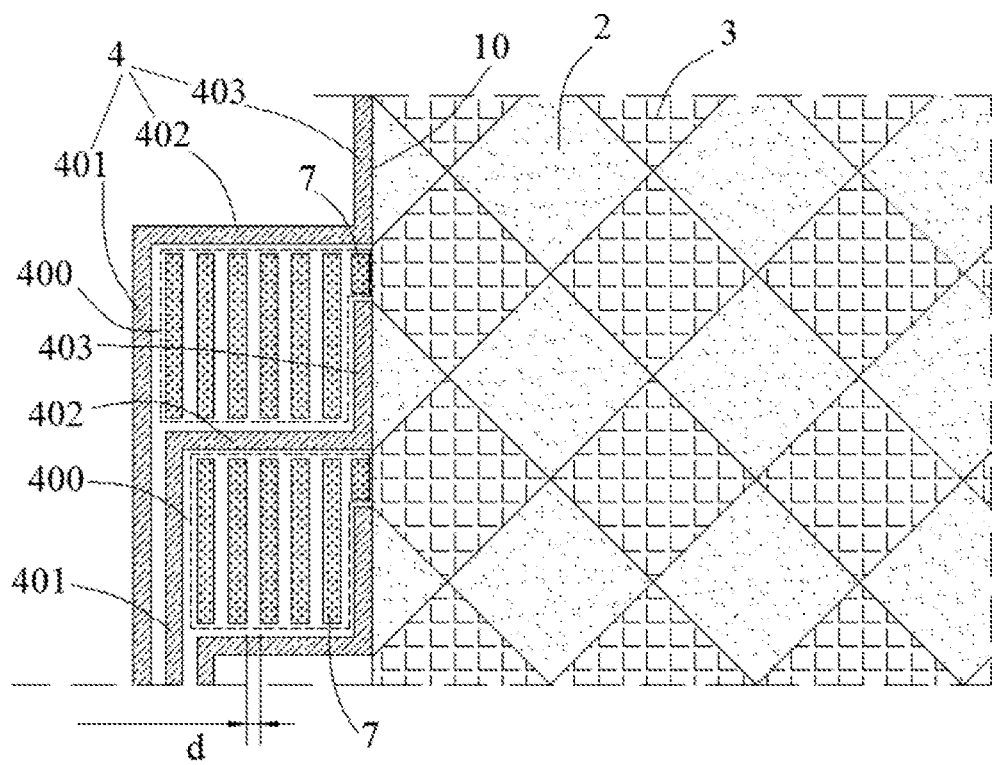
FIG. 7 and FIG. 8 are schematic diagrams illustrating a touch panel with a plurality of guard lines arranged in parallel according to an embodiment of the present disclosure.

As shown in FIG. 1 and FIG. 7, the first touch signal line 4 may include a first touch segment 401 and a second touch segment 402 connected in sequence. The first touch segment 401 may be arranged in parallel with the second touch electrode 3, that is, the first touch segment 401 may be parallel to the second direction. One end of the second touch segment 402 is in contact with the first touch segment 401, and the other end of the second touch segment 402 is electrically connected with the first touch electrode 2. The second touch segment 402 may be perpendicular to the first touch segment 401, but the embodiments of the present disclosure are not limited thereto. In addition, the first touch signal line 4 may further include a third touch segment 403. The third touch segment 403 is parallel to the first touch segment 401, and the third touch segment 403 is in contact with the first touch electrode 2 and the second touch segment 402, respectively.

Figure 8:
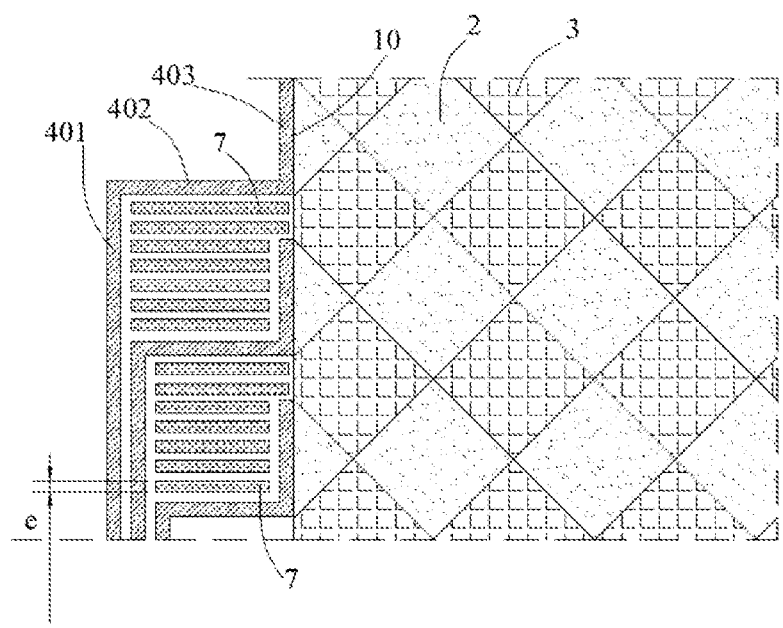
Figure 9:
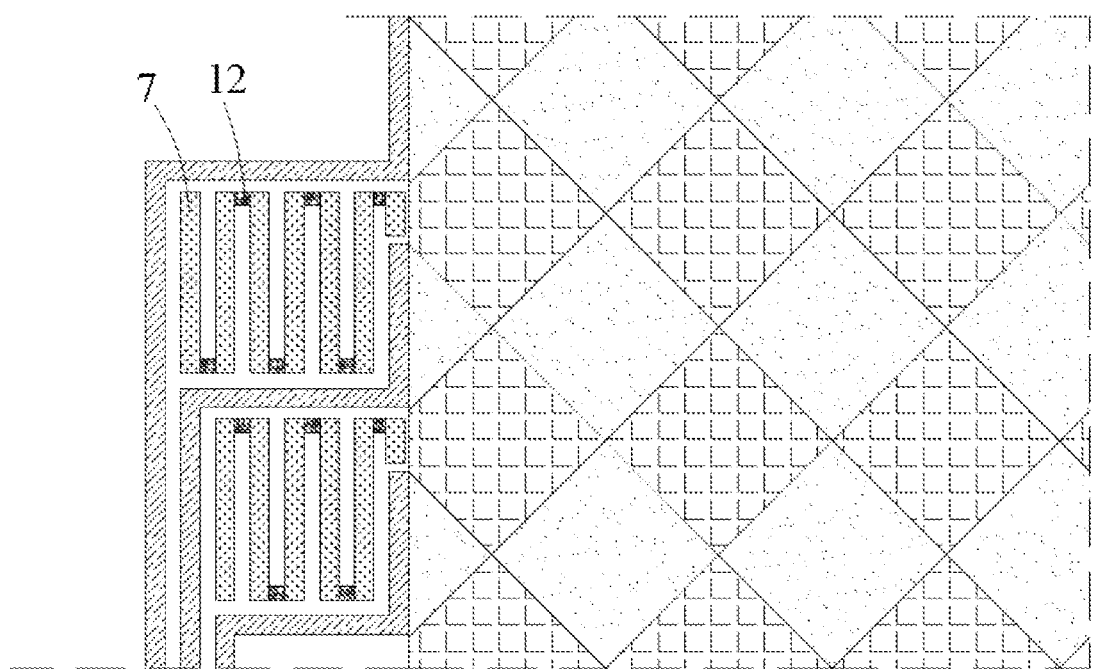
FIG. 9 and FIG. 10 are schematic diagrams illustrating a touch panel with a connecting portion according to an embodiment of the present disclosure.
Figure 10:
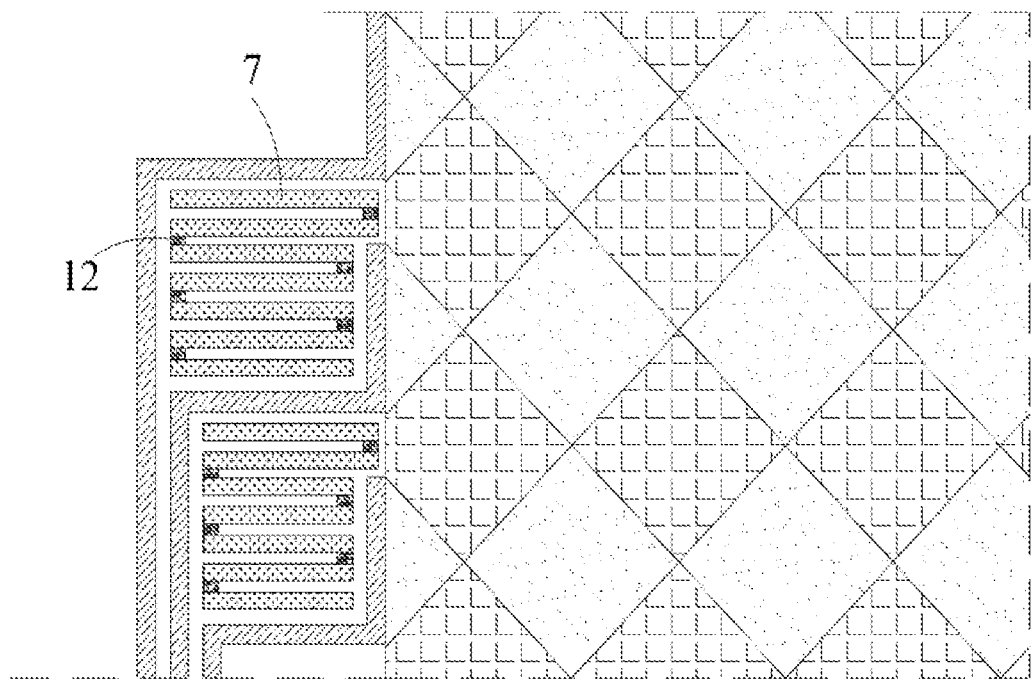
Figure 11:
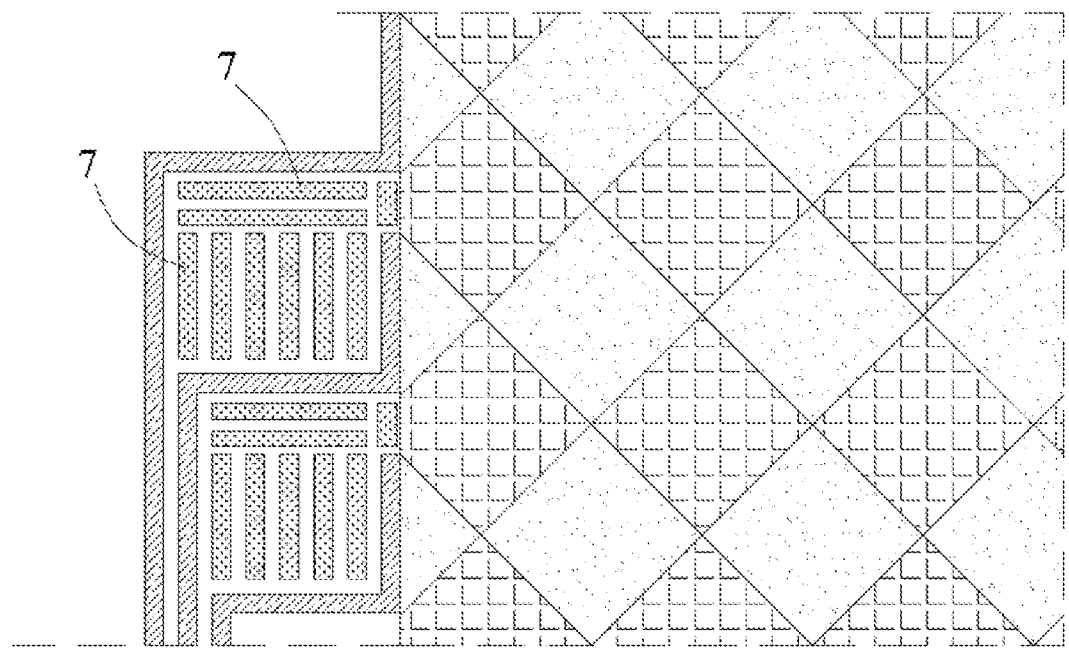
FIG. 11 and FIG. 12 are schematic diagrams illustrating a touch panel with two guard lines arranged vertically according to an embodiment of the present disclosure.
Figure 12:
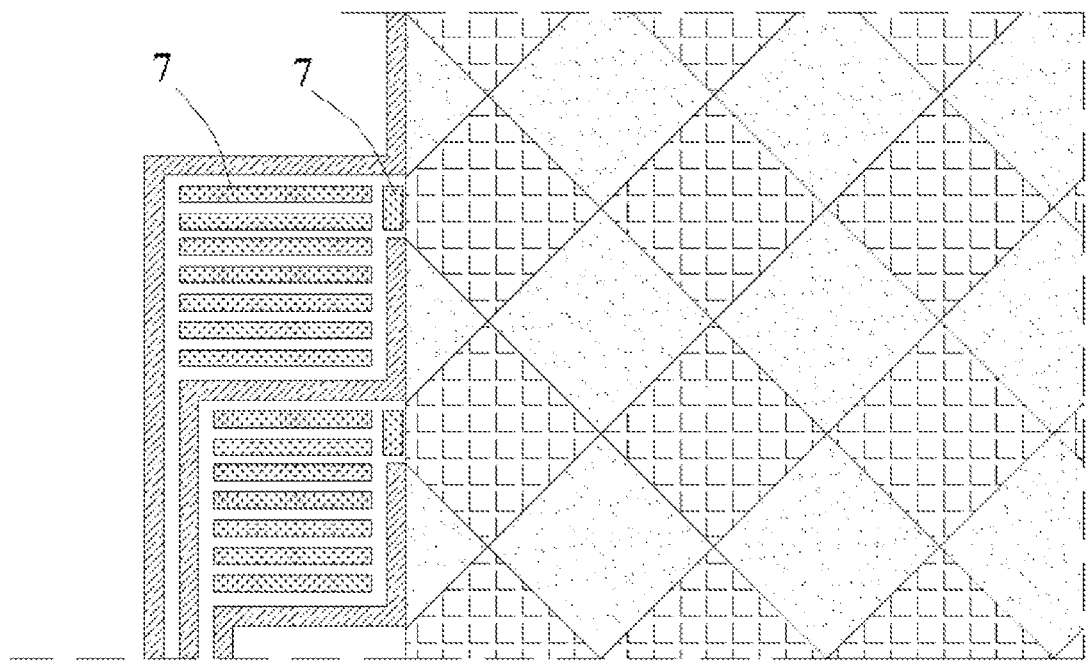

The guard line 7 may be provided on a side of the above-described encapsulation layer 18 facing away from the base 13. The guard line 7 may be made of a metal, such as copper. The guard line 7 may be made of the same material as that of the first touch signal line 4, and the guard line 7 may be provided in the same layer as the first touch signal line 4. As shown in FIG. 8, the guard line 7 may have a width e greater than or equal to 4 µm, for example, the width of the guard line 7 may be 4.5 µm, 5 µm, 6 µm, etc. The width of the guard line 7 may be the same as that of the first touch signal line 4; however, the width of the guard line 7 may be different from that of the first touch signal line 4. As shown in FIG. 7, a guard area 400 may be provided between the first touch segment 401 of each of the above-described first touch signal lines 4 and the touch area 100. The guard line 7 may be disposed in the guard area 400. The guard line 7 in a respective guard area 400 may be parallel to the first touch segment 401, or may be perpendicular to the first touch segment 401. A plurality of guard lines 7 may be provided in the guard area 400, and multiple of the plurality of guard lines 7 may be arranged in parallel. All of the guard lines 7 in the guard area 400 may be arranged in parallel. However, a part of the plurality of guard lines 7 in the guard area 400 may be arranged in parallel. A distance d between adjacent two of the multiple guard lines 7 arranged in parallel may be less than 4 µm, for example, 3.5 µm, 3 µm, 2 µm, etc. However, the distance d between adjacent two of the multiple guard lines 7 arranged in parallel may also be greater than or equal to 4 µm. The multiple guard lines 7 arranged in parallel may be parallel to the first touch segment 401 as shown in FIG. 7, or may be perpendicular to the first touch segment 401 as shown in FIG. 8. As shown in FIGS. 9 and 10, the touch panel according to the present disclosure may further include a connecting portion 12. The connecting portion 12 may be disposed on the side of the above-described encapsulation layer 18 facing away from the base 13. Two of the multiple guard lines 7 arranged in parallel may be connected through the connection portion 12. Further, any adjacent two of the multiple guard lines 7 arranged in parallel may be connected through a connecting portion 12, and two adjacent connecting portions 12 may be arranged in a staggered fashion in a direction perpendicular to the guard lines 7. The connecting portion 12 may be made of the same material as that of the guard line 7. In addition, as shown in FIGS. 11 and 12, two of the plurality of guard lines 7 in the guard area 400 may be perpendicular to each other, and one of the two guard lines 7 perpendicular to each other is parallel to the first touch segment 401, and the other is perpendicular to the first touch segment 401. As shown in FIG. 13, the guard line 7 may be provided on the surface of the first insulation layer 19 facing away from the base 13.

As shown in FIG. 7, a plurality of guard areas 400 may be distributed at intervals in a direction in which the second touch electrode 3 extends. Two adjacent guard areas 400 may be separated from each other by the second touch segment 402. Two adjacent guard areas 400 may have different numbers of guard lines 7 provided therein. As shown in FIG. 5 and FIG. 7, for example, in the case that the bonding area 300 is disposed on the side of the first side 11 of the touch area 100 away from the third side 9 and the second touch electrode 3 is perpendicular to the first side 11, for any two guard areas 400, the number of the guard lines 7 in the guard area 400 close to the bonding area 300 is less than the number of the guard lines 7 in the guard area 400 away from the bonding area 300.

In addition, as shown in FIG. 1, the touch panel according to embodiments of the present disclosure may further include a second touch signal line 5. The second touch signal line 5 may be provided on the base substrate 1 and located in the peripheral area 200. As shown in FIG. 5 and FIG. 6, one end of the second touch signal line 5 is electrically connected with the second touch electrode 3, and the other end of the second touch signal line 5 extends to the bonding area 300 to be electrically connected with the external circuit interface. As shown in FIG. 13, the second touch signal line 5 may be disposed on the surface of the first insulation layer 19 facing away from the base 13. A width of the second touch signal line 5 may be the same as that of the first touch signal line 4, or may be different from that of the first touch signal line 4. At least part of the guard line 7, at least part of the first touch signal line 4, at least part of the second touch signal line 5, at least part of the first touch electrode 2, and at least part of the second touch electrode 3 may be provided in the same layer. The second touch signal line 5 may also include a touch segment parallel to the first touch electrode 2, and the above-described guard area 400 may also be provided between the touch segment and the second touch electrode 3. The guard area 400 is provided with a guard line 7 separated from the second touch signal line 5. In the structure shown in FIG. 5, the first touch electrode 2 is a touch driving electrode, the second touch electrode 3 is a touch sensing electrode, and the touch panel adopts a 1T1R driving mode. In the structure shown in FIG. 6, the first touch electrode 2 is a touch sensing electrode, the second touch electrode 3 is a touch driving electrode, and the touch panel adopts a 2T1R driving mode. In other embodiments of the present disclosure, the touch panel may adopt other driving modes.

Embodiments of the present disclosure further provide a display apparatus. The display apparatus may include the touch panel according to any one of the above embodiments. The display apparatus may include a mobile phone, a tablet computer, a TV, etc. Since the display apparatus according to embodiments of the present disclosure includes the same touch panel as the touch panel according to the above embodiments of the touch panel, the two have the same beneficial effects, which will not be repeated herein.

The foregoing are merely preferred embodiments of the present disclosure, and do not limit the present disclosure in any form. Although the present disclosure has been disclosed as above in the preferred embodiments, the present disclosure is not limited thereto. Any person skilled in the art may utilize the technical contents disclosed above to make some variations or modifications into equivalent embodiments with equivalent changes, without departing from the scope of the technical solution of the present disclosure. Any simple variations, equivalent changes and modifications made to the above embodiments based on the technical essence of the present disclosure without departing from the contents of the technical solution of the present disclosure shall fall within the scope of the technical solution of the present disclosure.

The invention claimed is:

1. A touch panel, comprising a touch area and a peripheral area surrounding the touch area, the touch panel comprising:
a base substrate;
a first touch electrode and a second touch electrode arranged to intersect with each other, provided on the base substrate and located in the touch area;
a first touch signal line, provided on the base substrate and located in the peripheral area, and electrically connected with the first touch electrode; and
a guard line provided on the base substrate, located between the first touch signal line and the touch area, and separated from the first touch signal line and from the touch area, wherein the guard line is in a floating state, and is configured to shield an interference between the first touch signal line and the second touch electrode in the touch area.

2. The touch panel according to claim 1, wherein the first touch signal line comprises a first touch segment arranged in parallel with the second touch electrode, and the guard line is provided between the first touch segment and the touch area.

3. The touch panel according to claim 2, wherein the guard line is parallel or perpendicular to the first touch segment.

4. The touch panel according to claim 2, wherein a plurality of guard lines are provided between the first touch segment and the touch area.

5. The touch panel according to claim 4, wherein multiple of the plurality of guard lines are arranged in parallel.

6. The touch panel according to claim 5, wherein the multiple guard lines arranged in parallel are parallel or perpendicular to the first touch segment.

7. The touch panel according to claim 5, further comprising:
a connecting portion, through which two of the multiple guard lines arranged in parallel are connected.

8. The touch panel according to claim 7, wherein any adjacent two of the multiple guard lines arranged in parallel are connected through the connecting portion, and adjacent two of respective connecting portions are arranged in a staggered fashion in a direction perpendicular to the guard lines.

9. The touch panel according to claim 7, wherein the connecting portion and the guard line are made of a same material.

10. The touch panel according to claim 4, wherein two of the plurality of guard lines are perpendicular to each other.

11. The touch panel according to claim 10, wherein one of the two guard lines perpendicular to each other is parallel to the first touch segment.

12. The touch panel according to claim 2, wherein
the first touch electrode comprises a plurality of first touch electrodes, the first touch signal line comprises a plurality of first touch signal lines, and the plurality of first touch signal lines are electrically connected with the plurality of first touch electrodes in a one-to-one correspondence; and
a guard area is provided between the first touch segment of each of the plurality of first touch signal lines and the touch area, and is provided with the guard line therein.

13. The touch panel according to claim 12, wherein respective guard areas are distributed at intervals in a direction in which the second touch electrode extends.

14. The touch panel according to claim 13, wherein the first touch signal line further comprises a second touch segment, one end of the second touch segment is in contact with the first touch segment, and the other end of the second touch segment is electrically connected with the first touch electrode, and two adjacent guard areas are separated from each other by the second touch segment.

15. The touch panel according to claim 14, wherein the second touch segment is perpendicular to the first touch segment.

16. The touch panel according to claim 14, wherein the first touch signal line further comprises a third touch segment, and the third touch segment is parallel to the first touch segment, and the third touch segment is in contact with the first touch electrode and the second touch segment, respectively.

17. The touch panel according to claim 1, wherein the guard line has a same width as that of the first touch signal line.

18. The touch panel according to claim 1, wherein
the first touch electrode is a touch sensing electrode, and the second touch electrode is a touch driving electrode; or
the first touch electrode is a touch driving electrode, and the second touch electrode is a touch sensing electrode.

19. The touch panel according to claim 1, further comprising:
a second touch signal line provided on the base substrate, located in the peripheral region, and electrically connected with the second touch electrode, wherein the guard line is provided between the second touch signal line and the touch area, and is separated from the second touch signal line.

20. A display apparatus, comprising a touch panel that comprises a touch area and a peripheral area surrounding the touch area, and comprises:
a base substrate;
a first touch electrode and a second touch electrode arranged to intersect with each other, provided on the base substrate and located in the touch area;

a first touch signal line, provided on the base substrate and located in the peripheral area, and electrically connected with the first touch electrode; and a guard line provided on the base substrate, located between the first touch signal line and the touch area, and separated from the first touch signal line and from the touch area, wherein the guard line is in a floating state, and is configured to shield an interference between the first touch signal line and the second touch electrode in the touch area.

* * * * *